US012603062B2

(12) United States Patent
Kang

(10) Patent No.: US 12,603,062 B2
(45) Date of Patent: Apr. 14, 2026

(54) IMAGE DISPLAY DEVICE

(71) Applicant: LG ELECTRONICS INC., Seoul (KR)

(72) Inventor: Hyunku Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/867,210

(22) PCT Filed: May 2, 2023

(86) PCT No.: PCT/KR2023/005985
§ 371 (c)(1),
(2) Date: Nov. 19, 2024

(87) PCT Pub. No.: WO2023/229250
PCT Pub. Date: Nov. 30, 2023

(65) Prior Publication Data

US 2025/0322803 A1 Oct. 16, 2025

(30) Foreign Application Priority Data

May 25, 2022 (KR) ........................ 10-2022-0064076

(51) Int. Cl.
*G09G 3/34* (2006.01)

(52) U.S. Cl.
CPC ..... *G09G 3/3426* (2013.01); *G09G 2320/062* (2013.01); *G09G 2320/064* (2013.01); *G09G 2320/0646* (2013.01)

(58) Field of Classification Search
CPC ........... G09G 3/3426; G09G 2320/062; G09G 2320/064; G09G 2320/0646
See application file for complete search history.

(56) References Cited

U.S. PATENT DOCUMENTS

| | | | | |
|---|---|---|---|---|
| 10,739,639 | B2 * | 8/2020 | Wu ........................ | H05B 45/46 |
| 2011/0069095 | A1 | 3/2011 | Kim et al. | |

(Continued)

FOREIGN PATENT DOCUMENTS

| | | |
|---|---|---|
| KR | 10-0964468 | 6/2010 |
| KR | 10-2010-0080024 | 7/2010 |

(Continued)

OTHER PUBLICATIONS

PCT International Application No. PCT/KR2023/005985, International Search Report dated Aug. 25, 2023, 4 pages.

(Continued)

*Primary Examiner* — David Tung
(74) *Attorney, Agent, or Firm* — LEE, HONG, DEGERMAN, KANG & WAIMEY

(57) ABSTRACT

The present invention relates to an image display device. An image display device according to one embodiment of the present invention comprises: a display panel; a backlight unit including a plurality of blocks composed of light sources; and a control unit, wherein the backlight unit includes a plurality of driving units each including a driver integrated circuit (IC) that controls the intensity of light emitted from the blocks, wherein each of the plurality of driving units includes: a main driving unit electrically connected to the control unit through a main cable; and a sub-driving unit electrically connected to the main driving unit through a sub-cable, wherein signals transmitted to the main driving unit through the main cable are transmitted to the sub-driving unit through the sub-cable, wherein the control unit outputs a first signal including a dimming value for each block corresponding to the intensity of light emitted from each of the plurality of blocks, a second signal corresponding to the main driving unit, and a third signal corresponding to the sub-driving unit through the main cable, (Continued)

wherein the main driving unit may determine a first dimming value corresponding to the main driving unit from the first signal on the basis of the second signal, and the sub-driving unit may determine a second dimming value corresponding to the sub-driving unit from the first signal on the basis of the third signal. Various other embodiments are possible.

9 Claims, 12 Drawing Sheets

(56) References Cited

U.S. PATENT DOCUMENTS

| | | | | |
|---|---|---|---|---|
| 2011/0096099 | A1* | 4/2011 | Yamamoto | H05B 45/46 345/690 |
| 2018/0231838 | A1 | 8/2018 | Kumamoto et al. | |
| 2020/0320940 | A1 | 10/2020 | Lee et al. | |
| 2022/0114975 | A1* | 4/2022 | Kim | G09G 3/3426 |
| 2022/0122552 | A1 | 4/2022 | Lin et al. | |

FOREIGN PATENT DOCUMENTS

| | | |
|---|---|---|
| KR | 10-2011-0043205 | 4/2011 |
| KR | 10-1308752 | 9/2013 |
| KR | 10-2017-0066883 | 6/2017 |
| KR | 10-2018-0098384 | 9/2018 |
| KR | 10-2021-0036116 | 4/2021 |
| KR | 10-2022-0047113 | 4/2022 |

OTHER PUBLICATIONS

Korean Intellectual Property Office Application No. 10-2022-0064076, Office Action dated Aug. 29, 2024, 2 pages.

European Patent Office Application Serial No. 23812026.5, Search Report dated Jun. 18, 2025, 18 pages.

* cited by examiner

[FIG. 1]
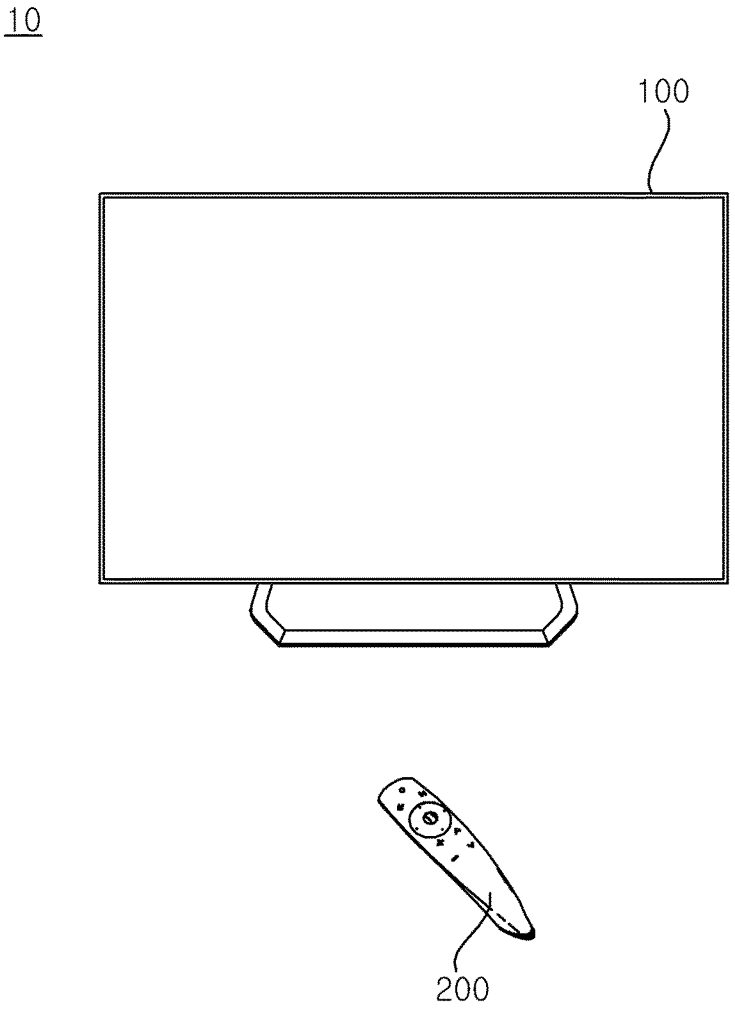

[FIG. 2]
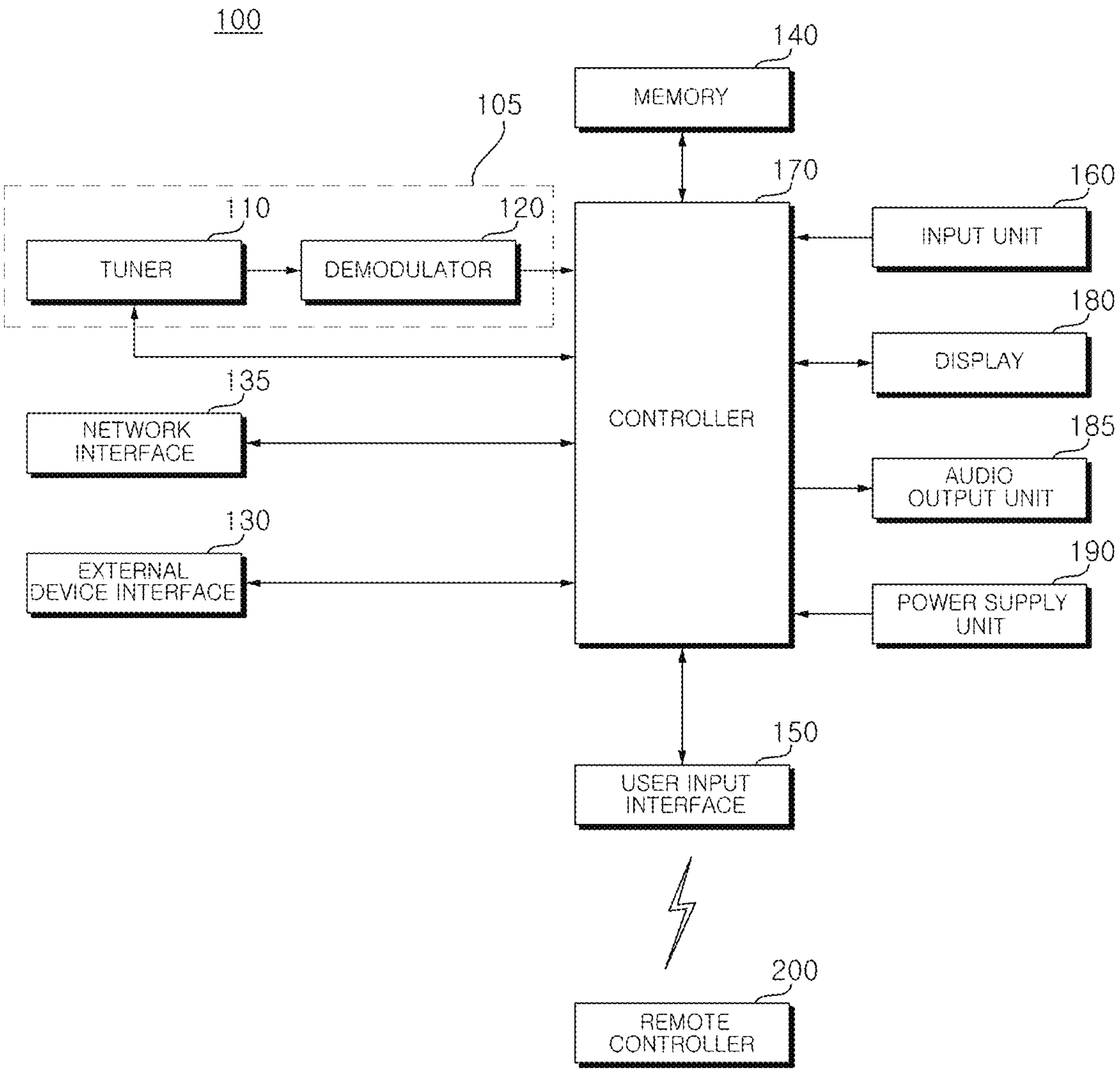

[FIG. 3]
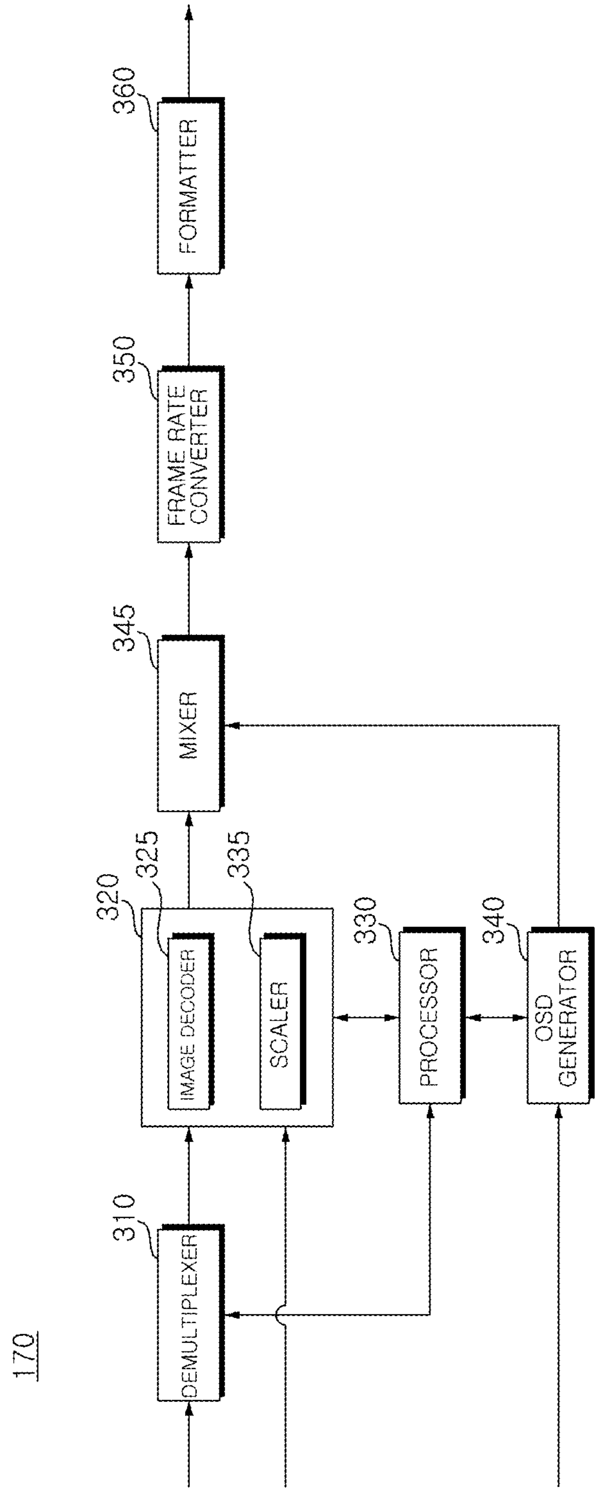

[FIG. 4]
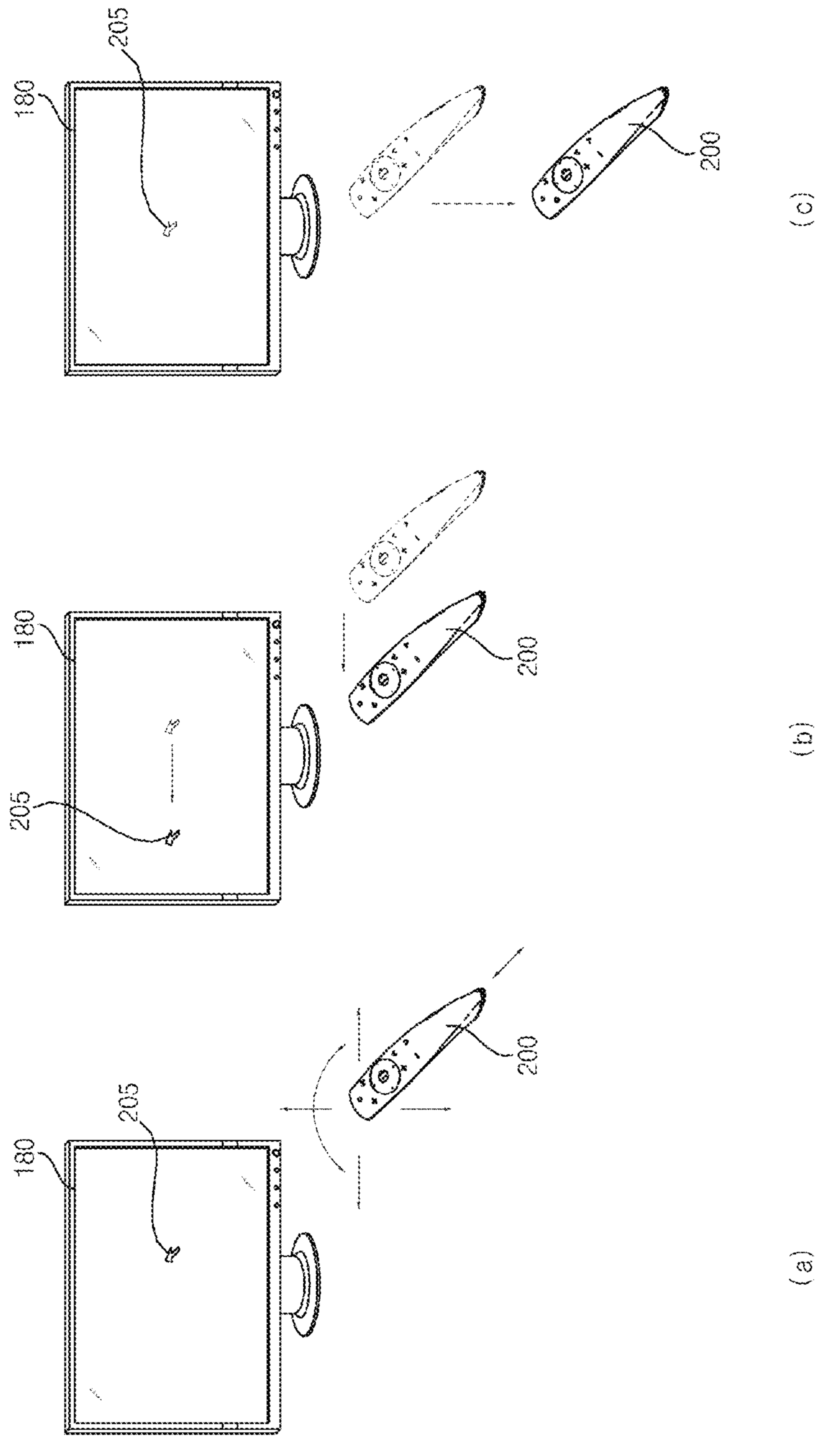

[FIG. 5]
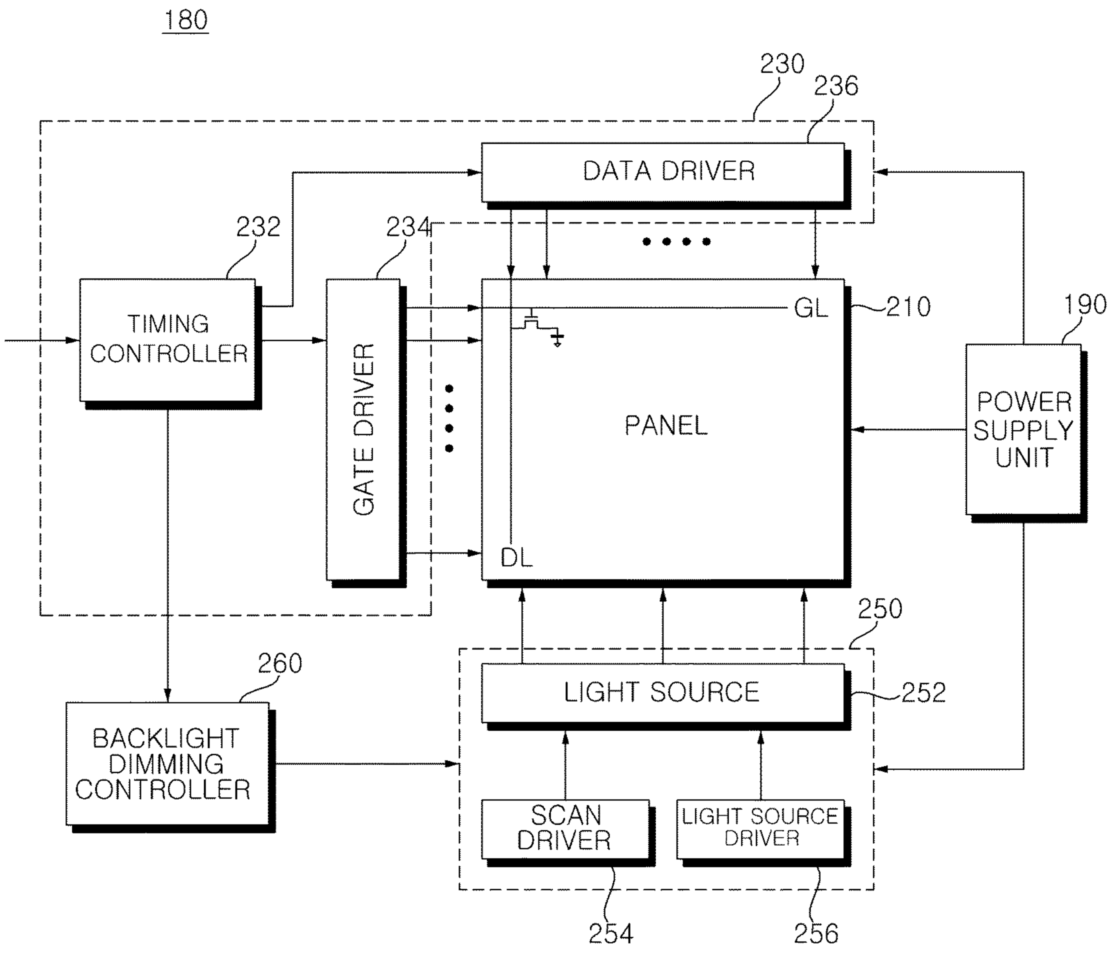

[FIG. 6]
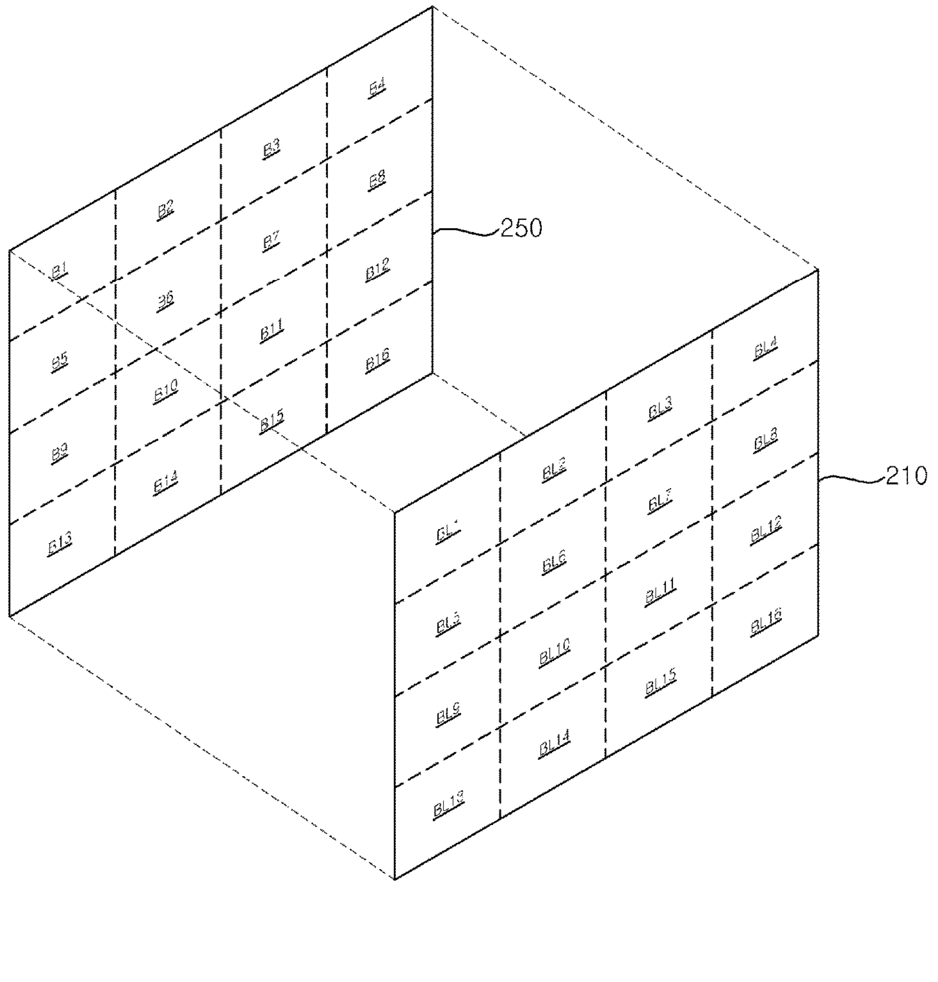

[FIG. 7]
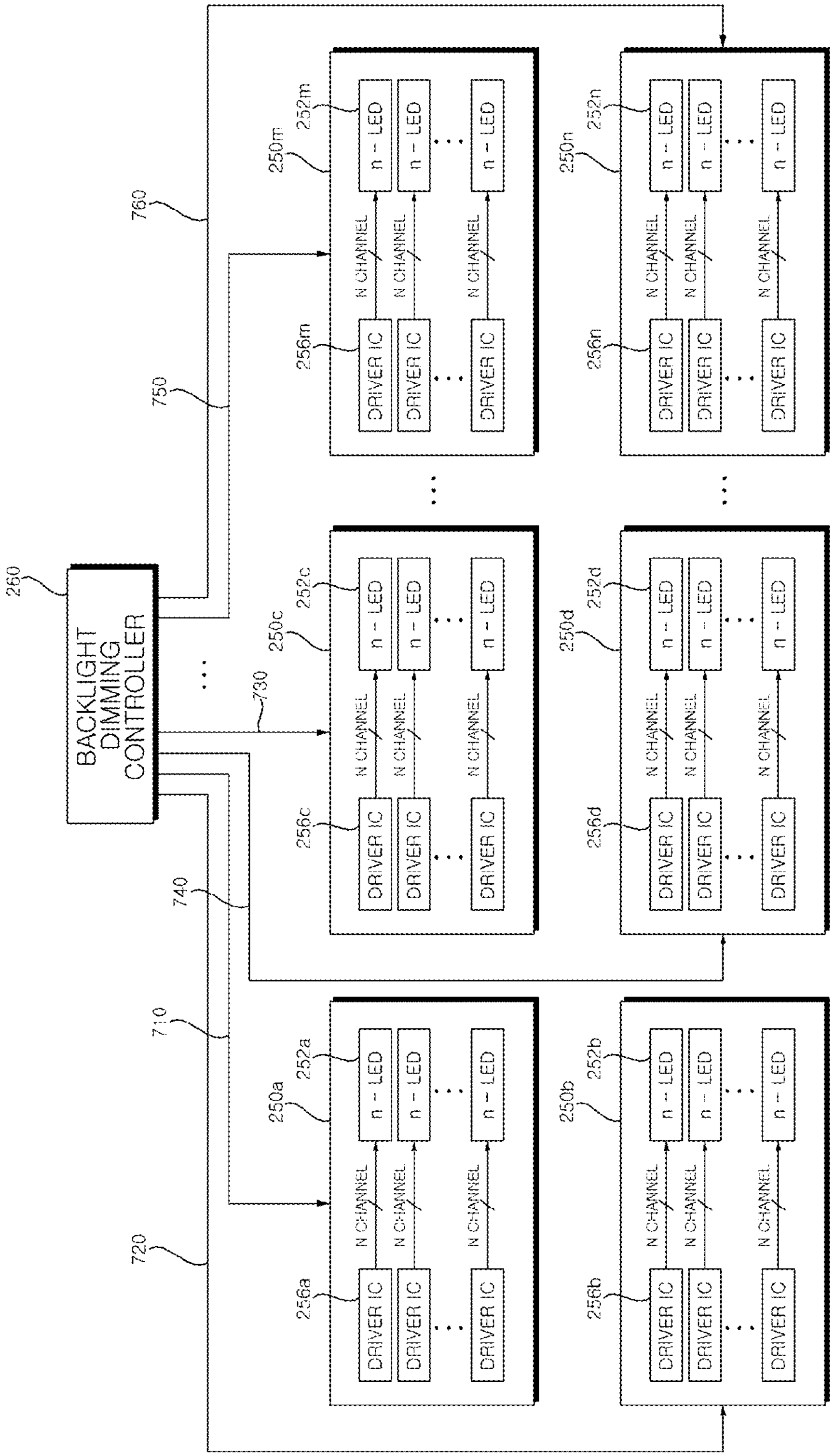

[FIG. 8]
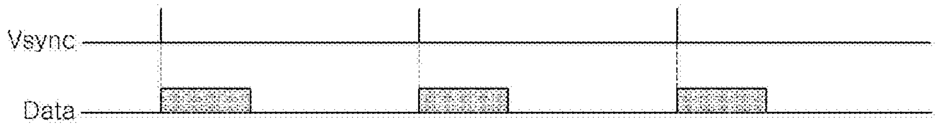

[FIG. 9]
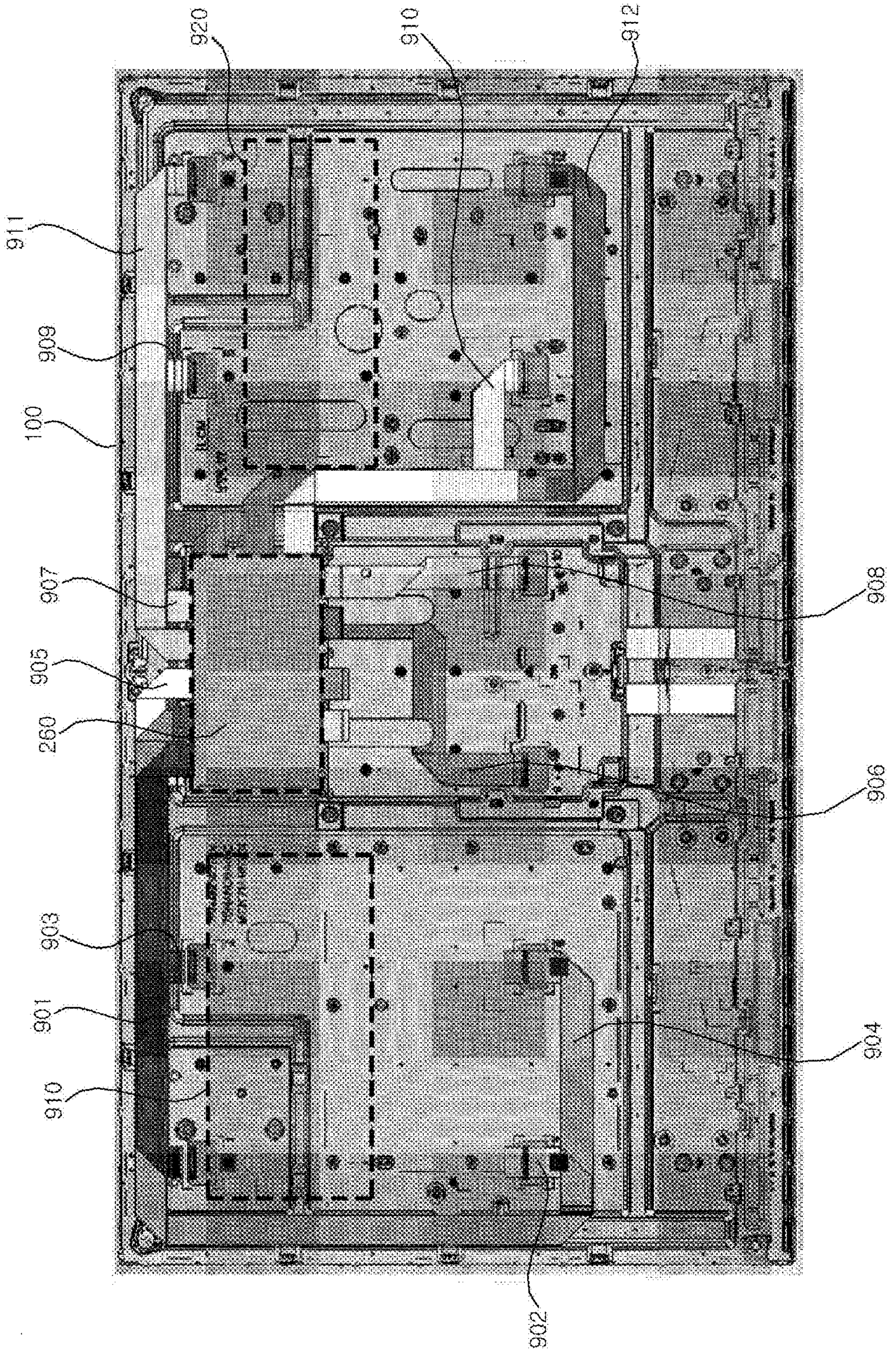

[FIG. 10]
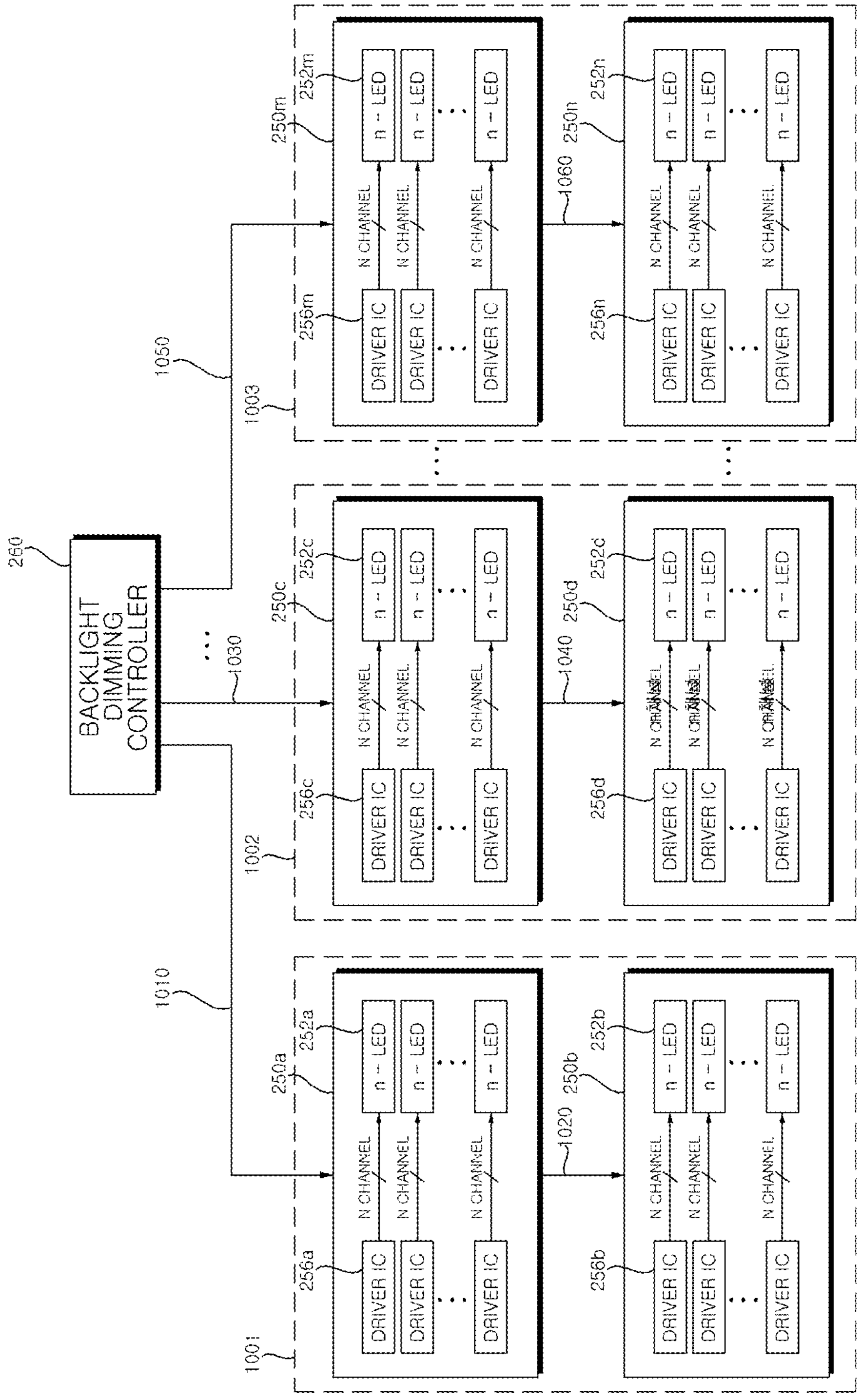

[FIG. 11]
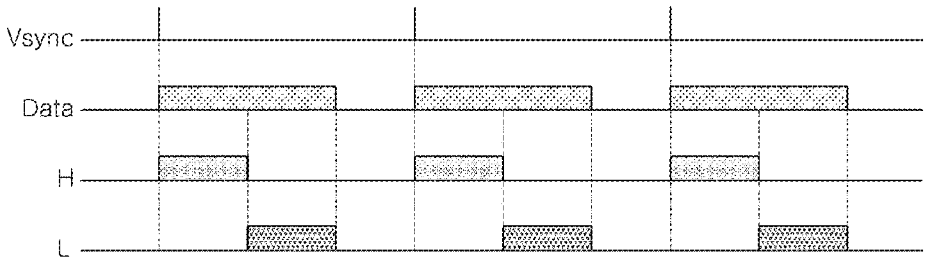

[FIG. 12]
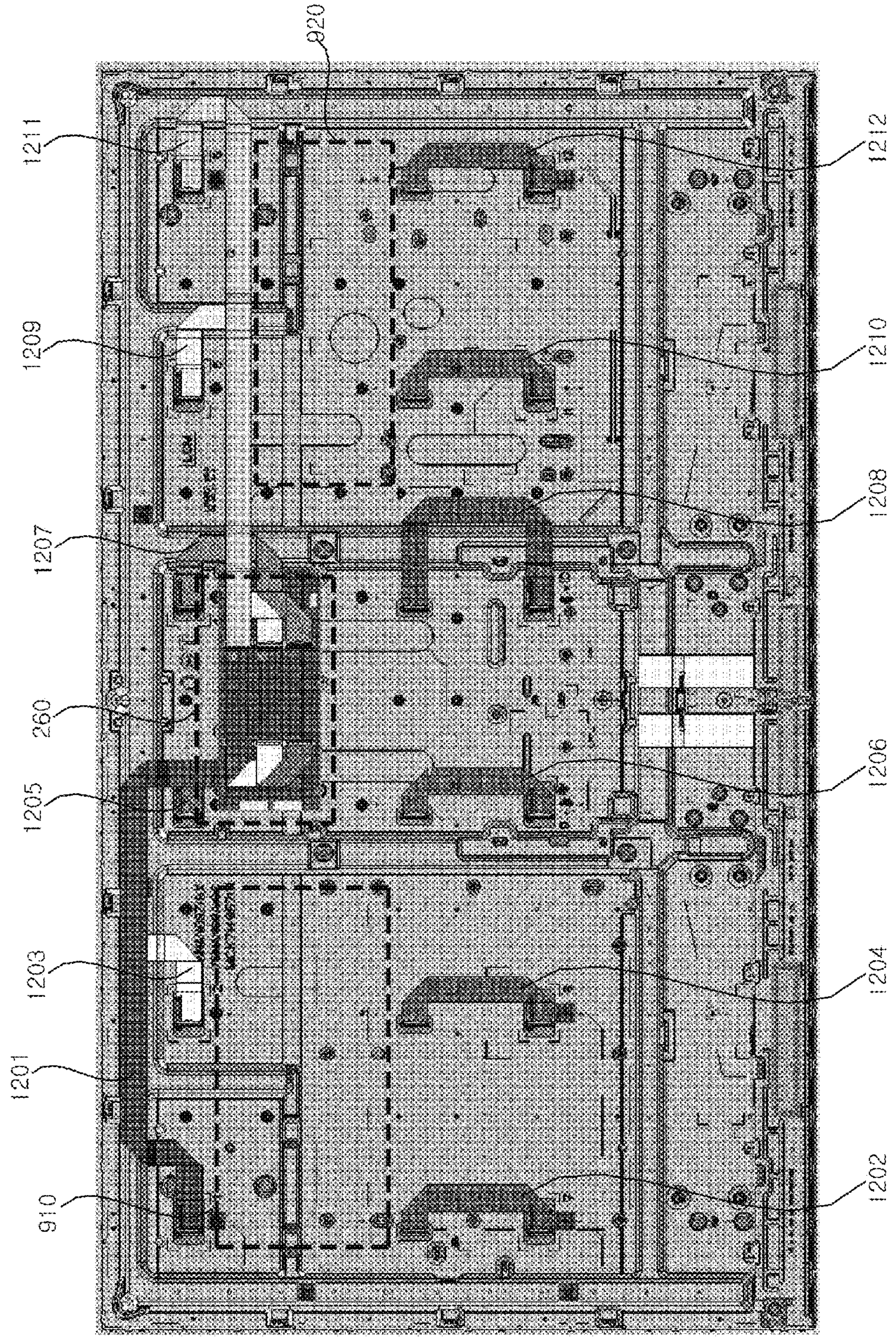

IMAGE DISPLAY DEVICE

CROSS-REFERENCE TO RELATED APPLICATIONS

This application is the National Stage filing under 35 U.S.C. 371 of International Application No. PCT/KR2023/005985, filed on May 2, 2023, which claims the benefit of earlier filing date and right of priority to Korean Application No. 10-2022-0064076, filed on May 25, 2022, the contents of which are all hereby incorporated by reference herein in their entireties.

TECHNICAL FIELD

The following description relates to an image display device.

BACKGROUND ART

An image display device is a device having the function of displaying images that are viewable by users. Typical examples of the image display device include a liquid crystal display (LCD) device using liquid crystal, an organic light-emitting diode (OLED) display device using OLEDs, and the like.

Among them, the LCD device includes a liquid crystal layer and displays an image by controlling an electric field applied to the liquid crystal layer and modulating light emitted by a light source of a backlight unit. Recently, a local dimming method using multiple light sources is used in order to reduce power consumption of the backlight unit and to improve the contrast ratio and sharpness of an image. The local dimming method may include dividing input image data into virtual screen areas which are divided in a matrix form on a display panel, and classifying light sources of the backlight unit according to screen areas. In this case, the method may be a method of locally controlling luminance of each screen area by adjusting brightness of the respective light sources of the backlight unit according to a representative value for each screen area.

Meanwhile, as an area of the display panel provided in the image display device increases, the number of light sources included in the backlight unit may increase, and a distance between a component for outputting a control signal according to the local dimming method and a component for adjusting the brightness of the light sources according to the control signal may increase. As a result, problems occur in that a connection structure between the respective components becomes complicated, and impedance of a signal line for transmitting a signal to the backlight unit increases. In addition, there is also a problem in that due to the increase in length of the signal line, electromagnetic waves and the like generated in other components may increase the possibility of noise components occurring in the signal line.

DISCLOSURE OF INVENTION

Technical Problem

It is an objective of the present disclosure to solve the above and other problems.

It is another objective of the present disclosure to provide an image display device capable of simplifying a connection structure between components provided for adjusting the intensity of light emitted by a light source.

It is yet another objective of the present disclosure to provide an image display device capable of minimizing the length of a signal line configured to transmit signals to a backlight unit.

Technical Solution

In order to achieve the above and other objectives, an image display device according to an embodiment of the present disclosure includes: a display panel; a backlight unit including a plurality of blocks composed of light sources; and a controller, wherein the backlight unit includes a plurality of driving units each including a driver integrated circuit (IC) configured to adjust an intensity of light emitted from the respective blocks, wherein the plurality of driving units include main driving units electrically connected to the controller through main cables, and sub-driving units electrically connected to the main driving units through sub-cables, wherein signals transmitted to the main driving units through the main cables are transmitted to the sub-driving units through the sub-cables, wherein the controller is configured to output, through the main cables, a first signal including a dimming value of each block that corresponds to the intensity of light emitted from each of the plurality of blocks, a second signal corresponding to the main driving unit, and a third signal corresponding to the sub-driving unit, wherein the main driving unit is configured to determine a first dimming value corresponding to the main driving unit from the first signal based on the second signal, and the sub-driving unit is configured to determine a second dimming value corresponding to the sub-driving unit from the first signal based on the third signal.

Advantageous Effects of Invention

An image display device according to the present disclosure has the following effects.

According to at least one embodiment of the present disclosure, a connection structure between components provided for adjusting the intensity of light emitted by a light source may be simplified.

According to at least one embodiment of the present disclosure, the length of a signal line configured to transmit signals to a backlight unit may be minimized.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF DRAWINGS

FIG. 1 is a diagram illustrating an image display system according to various embodiments of the present disclosure.

FIG. 2 is an internal block diagram of an image display device of FIG. 1.

FIG. 3 is a diagram referred to in the description of a controller of FIG. 2.

FIG. 4 is a diagram illustrating a method of controlling a remote controller of FIG. 2.

FIGS. 5 and 6 are diagrams referred to in the description of a display of FIG. 2.

FIGS. 7 to 12 are diagrams referred to in the description of an image display device according to an embodiment of the present disclosure.

MODE FOR THE INVENTION

Hereinafter, the present disclosure will be described in detail with reference to the accompanying drawings. In order to clearly and briefly describe the present disclosure, components that are irrelevant to the description will be omitted in the drawings, and the same reference numerals are used throughout the drawings to designate the same or similar components.

The terms "module" and "unit" for elements used in the following description are given simply in view of the ease of the description, and do not have a distinguishing meaning or role. Therefore, the "module" and "unit" may be used interchangeably.

It should be understood that the terms "comprise", 'include", "have", etc. when used in this specification, specify the presence of stated features, integers, steps, operations, elements, components, or combinations thereof but do not preclude the presence or addition of one or more other features, integers, steps, operations, elements, components, or combinations thereof.

It will be understood that, although the terms first, second, etc., may be used herein to describe various elements, these elements should not be limited by these terms. These terms are only used to distinguish one element from another.

FIG. 1 is a diagram illustrating an image display system according to various embodiments of the present disclosure.

Referring to FIG. 1, an image display system 10 includes an image display device 100 and/or a remote controller 200.

The image display device 100 may be a device for processing and outputting images. The image display device 100 may be a TV, a notebook computer, a monitor, etc., and is not particularly limited as long as the image display device is capable of outputting a screen corresponding to an image signal.

The image display device 100 may receive a broadcast signal and process the received signal, and may output a signal-processed broadcast image. In the case where the image display device 100 receives the broadcast signal, the image display device 100 may serve as a broadcast receiving device.

The image display device 100 may receive the broadcast signal wirelessly through an antenna or by wire via cables.

For example, the image display device 100 may receive a terrestrial broadcast signal, a satellite broadcast signal, a cable broadcast signal, an Internet Protocol TV (IPTV) broadcast signal, and the like.

The remote controller 200 may be connected wirelessly and/or by wire with the image display device 100 to provide various control signals to the image display device 100. In this case, the remote controller 200 may include a device for establishing a wired/wireless network with the image display device 100 and for transmitting various control signals to the image display device 100 or for receiving, from the image display device 100, signals related to various operations processed by the image display device 100, through the established network.

For example, various input devices, such as a mouse, a keyboard, a pointing device, a trackball, a joystick, etc., may be used as the remote controller 200. The remote controller 200 may be referred to as an external device, and the external device and the remote controller will be used interchangeably as needed hereinafter.

The image display device 100 may be connected to only a single remote controller 200 or may be simultaneously connected to two or more remote controllers 200, and may change an object displayed on a screen or adjust a screen state based on control signals provided by the respective remote controllers 200.

FIG. 2 is an internal block diagram of the image display device of FIG. 1.

Referring to FIG. 2, the image display device 100 may include a broadcast receiver 105, an external device interface 130, a network interface 135, a memory 140, a user input interface 150, an input unit 160, a controller 170, a display 180, an audio output unit 185, and/or a power supply unit 190.

The broadcast receiver 105 may include a tuner 110 and a demodulator 120.

Meanwhile, unlike the drawing, the image display device 100 may include only the broadcast receiver 105 and the external device interface 130, among the broadcast receiver 105, the external device interface 130, and the network interface 135. That is, the image display device 100 may not include the network interface 135.

The tuner 110 may select a broadcast signal corresponding to a channel selected by a user or broadcast signals corresponding to all prestored channels from among broadcast signals received via an antenna (not shown) or a cable (not shown). The tuner 110 may convert a selected broadcast signal into an intermediate frequency (IF) signal or a baseband video or audio signal.

For example, if the selected broadcast signal is a digital broadcast signal, the tuner 110 may convert the selected broadcast signal into a digital IF signal (DIF), and if the selected broadcast signal is an analog broadcast signal, the tuner 100 may convert the selected broadcast signal into an analog baseband video or audio signal CVBS/SIF. That is, the tuner 110 may process digital broadcast signals or analog broadcast signals. The analog baseband video or audio signal CVBS/SIF output from the tuner 110 may be directly input to the controller 170.

Meanwhile, the tuner 110 may sequentially select broadcast signals of all the broadcast channels stored through a channel memory function from among the received broadcast signals and may convert the selected broadcast signals into intermediate frequency (IF) signals or baseband video or audio signals.

Meanwhile, the tuner 110 may include a plurality of tuners for receiving broadcast signals of a plurality of channels. Alternatively, the tuner 110 may be a single tuner that simultaneously receives broadcast signals of a plurality of channels.

The demodulator 120 may receive a digital IF signal DIF converted by the tuner 110 and may demodulate the digital IF signal.

Upon performing demodulation and channel decoding, the demodulator 120 may output a stream signal TS. In this case, the stream signal may be a multiplexed video signal, audio signal or data signal.

The stream signal output from the demodulator 120 may be input to the controller 170. Upon performing demultiplexing, video/audio signal processing, etc., the controller 170 may output an image to the display 180 and may output sound to the audio output unit 185.

The external device interface 130 may transmit or receive data to or from a connected external device (not shown). To this end, the external device interface 130 may include an A/V input/output unit (not shown).

The external device interface 130 may be connected by wire/wirelessly to external devices, such as a digital versatile disc (DVD) player, a Blu-ray player, a game console, a camera, a camcorder, a computer (laptop), a set-top box, etc., and may perform input/output operations for external devices.

In addition, the external device interface 130 may establish a communication network with various remote controllers 200 as illustrated in FIG. 1, and may receive control signals related to operation of the image display device 100 from the remote controller 200 or may transmit data related to operation of the image display device 100 to the remote controller 200, through the established communication network.

The A/V input/output unit may receive video and audio signals of an external device. For example, the A/V input/output unit may include an Ethernet terminal, a USB port, a composite video banking sync (CVBS) terminal, a component terminal, an S-video terminal (analog), a digital visual interface (DVI) terminal, a high definition multimedia interface (HDMI) terminal, a mobile high-definition link (MHL) terminal, an RGB terminal, a D-SUB terminal, an IEEE 1394 terminal, an SPDIF terminal, a liquid HD terminal, etc. A digital signal input through such terminals may be transmitted to the controller 170. In this case, an analogue signal input through the CVBS terminal and the S-video terminal may be converted into a digital signal by an analogue/digital conversion unit (not shown), and then may be transmitted to the controller 170.

The external device interface 130 may include a wireless communication unit (not shown) for short-range wireless communication with other electronic devices. The external device interface 130 may exchange data with an adjacent mobile terminal through the wireless communication unit. For example, in a mirroring mode, the external device interface 130 may receive device information, running application information, application image, and the like from the mobile terminal.

The external device interface 130 may perform short-range wireless communication using Bluetooth, Radio Frequency Identification (RFID), infrared Data Association (IrDA), Ultra-Wideband (UWB), ZigBee, and the like.

The network interface 135 may provide an interface for connecting the image display device 100 to a wired/wireless network including an Internet network.

The network interface 135 may include a communication module (not shown) for connection with the wired/wireless network. For example, the network interface 135 may include a communication module for Wireless LAN (WLAN; Wi-Fi), Wireless broadband (Wibro), World Interoperability for Microwave Access (Wimax), High Speed Downlink Packet Access (HSDPA), and the like.

The network interface 135 may transmit or receive data to or from other users or other electronic devices through a connected network or another network linked to the connected network.

The network interface 135 may receive web content or data provided by a content provider or a network operator. That is, the network interface 135 may receive the web content or data, such as movies, advertisements, games, VOD, broadcast signals, etc., as well as information related thereto, which are provided by content providers or network providers through the network.

The network interface 135 may receive update information and an update file of firmware which are provided by network operators, and may transmit data to internet or content providers or network operators.

The network interface 135 may select a desired application from among a plurality of applications open to the public, and may receive the selected application through a network.

The memory 140 may store programs for processing and controlling each signal within the controller 180, and may store signal-processed video, audio or data signals. For example, the memory 140 may store applications designed to perform various operations which may be processed by the controller 170, and in response to a request from the controller 170, the memory 140 may selectively provide some of the stored applications.

The programs and the like stored in the memory 140 are not particularly limited, as long as the programs may be executed by the controller 170.

The memory 140 may also perform the function of temporarily storing video, audio or data signals received from an external device through the external device interface 130.

The memory 140 may store information on predetermined broadcast channels through a channel memory function, such as channel map and the like.

While FIG. 2 illustrates an example in which the memory 140 is provided separately from the controller 170, the scope of the present disclosure is not limited thereto, and the memory 140 may be included in the controller 170.

The memory 140 may include at least one of a volatile memory (e.g., DRAM, SRAM, SDRAM, etc.) and a non-volatile memory (e.g., flash memory, hard disk type memory (HDD), solid-state drive (SSD), etc.). In various embodiments of the present disclosure, the memory 140 and the memory may be used interchangeably.

The user input interface 150 may transmit a signal, input by a user, to the controller 170 or may transmit a signal, input from the controller 170, to the user.

For example, the user input interface 150 may transmit/receive a user input signal, such as power on/off, channel selection, screen setup, etc., to/from the remote controller 250, and may transmit a user input signal input through a local key (not shown), such as a power key, a channel key, a volume key, or a setup value, etc., to the controller 170, or may transmit a user input signal, input from a sensor unit (not shown), which senses a user's gesture, to the controller 170, or may transmit a signal from the controller 170 to the sensor unit.

The input unit 160 may be provided on one side of a main body of the image display device 100. For example, the input unit 160 may include a touchpad, a physical button, and the like.

The input unit 160 may receive various user commands associated with the operation of the image display device 100, and may transmit a control signal corresponding to the input command to the controller 170.

The input unit 160 may include at least one microphone (not shown), and may receive a user's speech through the microphone.

The controller 170 may include at least one processor, and by using the included processor, the controller 170 may control the overall operation of the image display device 100. Here, the processor may be a general processor such as a central processing unit (CPU). Obviously, the processor may be a dedicated device, such as an ASIC, or other hardware-based processor.

The controller 170 may demultiplex the stream signal received from the tuner 110, the demodulator 120, the external device interface 130, or the network interface 135 into a number of signals, or may process the demultiplexed signals into video or audio data and output the video or audio data.

The display 180 may convert a video signal, a data signal, an OSD signal, and a control signal processed by the controller 170 or a video signal, a data signal and a control signal received from the external device interface 130 to generate diving signals.

The display 180 may include a display panel (not shown) including a plurality of pixels.

The plurality of pixels included in the display panel may have RGB sub-pixels. Alternatively, the plurality of pixels included in the display panel may have RGBW sub-pixels. The display 180 may convert the video signal, data signal, OSD signal, control signal, and the like processed by the controller 170 to generate signals for driving the plurality of pixels.

The display 180 may be a Plasma Display Panel (PDP), a Liquid Crystal Display (LCD), an Organic Light Emitting Diode (OLED), a flexible display, or the like, and may also be a three-dimensional (3D) display. The 3D display 180 may be divided into an autostereoscopic display and a glasses-type display.

Further, the display 180 may be configured as a touch-screen to be used as an input device in addition to an output device.

The audio output unit 185 may receive an audio signal processed by the controller 170, and outputs the audio signal as sound.

The image signal processed by the controller 170 may be input to the display 180 to be displayed as an image corresponding to the image signal. Further, the image signal processed by the controller 170 may be input to an external output device through the external device interface 130.

The audio signal processed by the controller 170 may be output as sound to the audio output unit 185. Further, the audio signal processed by the controller 170 may be input to an external output device through the external device interface 130.

Although not illustrated in FIG. 2, the controller 170 may include a demultiplexer, a video processor, etc., which will be described later with reference to FIG. 3.

Besides, the controller 170 may control the overall operation of the image display device 100. For example, the controller 170 may control the tuner 110 to tune in to a broadcast channel selected by a user or a prestored channel.

In addition, the controller 170 may control the image display device 100 according to a user command input through the user input interface 150 or an internal program.

Meanwhile, the controller 170 may control the display 180 to display images. Here, the images displayed on the display 180 may be still images or moving images and may be 2D images or 3D images.

Meanwhile, the controller 170 may control a predetermined 2D object to be displayed in an image displayed on the display 180. For example, the object may be at least one of an accessed web screen (newspaper, magazine, etc.), an electronic program guide (EPG), various menus, a widget, an icon, a still image, a moving image, and text.

Meanwhile, the image display device 100 may further include an image capturing unit (not shown). The image capturing unit may capture images of a user. The image capturing unit may be implemented with one camera, but is not limited thereto, and may also be implemented with a plurality of cameras. Further, the image capturing unit may be embedded in the image display device 100 on the top of the display 180, or may be provided separately. Image information captured by the image capturing unit may be input to the controller 170.

The controller 170 may recognize a user's position based on the images captured by the image capturing unit. For example, the controller 170 may identify a distance (z-axis coordinates) between the user and the image display device 100. In addition, the controller 170 may identify x-axis coordinates and y-axis coordinates corresponding to a user's position in the display 180.

The controller 170 may sense a user's gesture based on the images captured by the image capturing unit or the respective signals sensed by the sensor unit, or a combination thereof.

The power supply unit 190 may supply power throughout the image display device 100. Particularly, the power supply unit 190 may supply power to the controller 170 implemented in the form of a system on chip (SOC), the display 180 for image display, the audio output unit 185 for audio output, and the like.

Specifically, the power supply unit 190 may include a converter for converting AC power into DC power and a DC/DC converter (not shown) for changing a DC power level.

The remote controller 200 transmits a user input to the user input interface 150. To this end, the remote controller 200 may use Bluetooth, radio frequency (RF) communication, infrared (IR) communication, Ultra Wideband (UWB), ZigBee, and the like. Furthermore, the remote controller 200 may receive video, audio or data signals output from the user input interface 150, and may display the received signals or output the same as sound through the remote controller 200.

Meanwhile, the aforementioned image display device 100 may be a fixed type or movable digital broadcast receiver capable of receiving digital broadcast.

Meanwhile, the block diagram of the image display device 100 illustrated in FIG. 2 is merely a block diagram for an embodiment of the present disclosure. Components of the block diagram may be integrated, added or omitted according to specifications of the actually implemented image display device 100.

That is, two or more components may be combined or one component may be divided into two or more components as needed. Furthermore, a function executed in each block is for description of an embodiment of the present disclosure, and a specific operation or device of each block is not intended to limit the scope of the present disclosure.

FIG. 3 is an internal block diagram of the controller of FIG. 2.

Referring to FIG. 3, the controller 170 according to an embodiment of the present disclosure may include a demultiplexer 310, an image processor 320, a processor 330, an OSD generator 340, a mixer 345, a frame rate converter 350, and/or a formatter 360. Besides, the controller 170 may further include an audio processor (not shown) and a data processor (not shown).

The demultiplexer 310 demultiplexes the input stream. For example, when an MPEG-2 TS is input, the demultiplexer 310 may demultiplex the MPEG-2 TS into video, audio, and data signals, respectively. Here, the stream signal input to the demultiplexer 310 may be a stream signal output from the tuner unit 110, the demodulator 120, or the external device interface 130.

The image processor 320 may perform image processing on the demultiplexed video signal. To this end, the image processor 320 may include an image decoder 325 and a scaler 335.

The image decoder 325 decodes the demultiplexed video signal, and the scaler 335 performs scaling so that the resolution of the decoded video signal may be output to the display 180.

The image decoder 325 may include a decoder of various standards. For example, a 3D image decoder for MPEG-2, H.264 decoder, a color image, and a depth image, and a decoder for a multiple view image may be provided.

The processor 330 may control the overall operation of the image processing device 100 or the controller 170. For example, the processor 330 may control the tuner 110 to tune in to an RF broadcast channel selected by a user or a prestored channel.

In addition, the processor 330 may control the image display device 100 by a user command input through the user input interface 150 or an internal program.

Further, the processor 330 may control data transmission with the network interface 135 or the external device interface 130.

Moreover, the processor 330 may control operations of the demultiplexer 310, the image processor 320, the OSD generator 340, and the like in the controller 170.

The OSD generator 340 generates an OSD signal according to a user input or by itself. For example, based on a user input signal input through the input unit 160, the OSD generator 340 may generate a signal for displaying a variety of information as a graphic or a text on the screen of the display 180.

The generated OSD signal may include various data such as a user interface screen of the image display device 100, various menu screens, a widget, and an icon. In addition, the generated OSD signal may include a 2D object or a 3D object.

In addition, the OSD generator 340 may generate a pointer that may be displayed on the display, based on a pointing signal input from the remote controller 200.

The OSD generator 340 may include a pointing signal processing unit (not shown) for generating a pointer. The pointing signal processing unit (not shown) may be provided separately, rather than being provided in the OSD generator 240.

The mixer 345 may mix an OSD signal generated by the OSD generator 340 with a decoded image signal image-processed by the image processor 320. The mixed image signal may be supplied to the frame rate converter 350.

The frame rate converter (FRC) 350 may convert the frame rate of an input image. Meanwhile, the frame rate converter 350 may also directly output the frame rate without any additional frame rate conversion.

The formatter 360 may arrange a left-eye video frame and a right-eye video frame of the 3D video signal subjected to frame rate conversion. Further, a synchronization signal Vsync may be output for opening the left-eye glass and the right-eye glass of the 3D viewing device (not shown).

Meanwhile, the formatter 360 may convert the format of an input image signal into an image signal to be displayed and output on the display 180.

In addition, the formatter 360 may change the format of a 3D image signal. For example, the formatter 360 may change the format of the 3D image signal into any one of various 3D formats such as a side by side format, a top/down format, a frame sequential format, an interlaced format, a checker box format, and the like.

Meanwhile, the formatter 360 may convert a 2D video signal into a 3D video signal. For example, the formatter 360 may detect an edge or a selectable object from the 2D video signal and separate an object according to the detected edge or the selectable object as a 3D video signal to thereby generate the 3D video signal according to a 3D video generation algorithm. In this case, the generated 3D video signal may be separated into a left-eye video signal L and a right-eye video signal R and aligned as described above.

Meanwhile, although not illustrated herein, a 3D processor (not shown) for 3-dimensional (3D) effect signal processing may be further provided following the formatter 360. Such a 3D processor (not shown) may control brightness, tint and color of a video signal for 3D effect enhancement. For example, the 3D processor (not shown) may perform signal processing for making a close-range view clear and blurring a distant view. The function of the 3D processor may be integrated with the formatter 360 or the image processor 320.

Meanwhile, the audio processor (not shown) included in the controller 170 may process a demultiplexed audio signal. To this end, the audio processor (not shown) may include various decoders.

In addition, the audio processor (not shown) included in the controller 170 may control base, treble, volume, and the like.

The data processor (not shown) included in the controller 170 may process the demultiplexed data signal. For example, when the demultiplexed data signal is an encoded data signal, the encoded data signal may be decoded. The encoded data signal may be electronic program guide (EPG) information including broadcast information such as start time and finish time of a broadcast program that is broadcast through each channel.

Meanwhile, the block diagram of the controller 170 illustrated in FIG. 3 is merely a block diagram for an embodiment of the present disclosure, and components of the block diagram may be integrated, added, or omitted according to the specifications of the actually implemented controller 170.

Particularly, each of the frame rate converter 350 and the formatter 360 may be separately provided instead of being included in the controller 170, or may be provided separately as one module.

FIG. 4 is a diagram illustrating a method of controlling the remote controller of FIG. 2.

Referring to FIG. 4, it can be seen that a pointer 205 corresponding to the remote controller 200 is displayed on the display 180 of the image display device 100.

Referring to (a) of FIG. 4, a user may move or rotate the remote controller 200 up and down, left and right, and back and forth. In this case, the pointer 205 displayed on the display 180 may be displayed according to movement of the remote controller 200. The remote controller 200 may be referred to as a spatial remote controller or a 3D pointing device, because the pointer 205 corresponding thereto is moved and displayed according to movement in a 3D space, as illustrated in the drawing.

Referring to (b) of FIG. 4, it can be seen that when the user moves the remote controller 200 to the left, the pointer 205 displayed on the display 180 of the image display device 100 also moves to the left according to the movement of the remote controller 200.

Information on movement of the remote controller 200 detected by a sensor of the remote controller 200 may be transmitted to the image display device 100. The image display device 100 may calculate coordinates of the pointer 205 based on the information on the movement of the remote controller 200. The image display device 100 may display the pointer 205 corresponding to the calculated coordinates.

Referring to (c) of FIG. 4, a user moves the remote controller 200 away from the display 180 while pressing a specific button on the remote controller 200. Thus, a selected area on the display 180 corresponding to the points 205 may be zoomed in and thus magnified. On the contrary, when the user moves the remote controller 200 toward the display 180, a selected area on the display 180 corresponding to the points 205 may be zoomed out and thus reduced.

Meanwhile, when the remote controller 200 moves away from the display 180, the selected area may be zoomed out, and when the remote controller 200 approaches the display 180, the selected area may be zoomed in.

Meanwhile, when a user presses a specific button of the remote controller 200, up/down movement and left/right movement may not be recognized. That is, when the remote controller 200 moves away from or closer to the display 180, up/down movement and left/right movement may not recognized, but only the forward/backward movement may be recognized. When the user does not press the specific button of the remote controller 200, only the up/down movement and left/right movement of the remote controller 200 may be recognized, and only the pointer 205 may move accordingly.

Meanwhile, a moving speed or moving direction of the pointer 205 may correspond to a moving speed or moving direction of the remote controller 200.

FIGS. 5 and 6 are diagrams referred to in the description of a display of FIG. 2.

Referring to FIG. 5, the display 180 may include a display panel 210 and a panel driver 230.

The display panel 210 may include a plurality of pixels P. The plurality of pixels P may be connected to a plurality of gate lines GL and data lines DL that intersect in a matrix form. A plurality of thin film transistors (TFTs) may be disposed at the intersection of the plurality of gate lines GL and data lines DL. The plurality of pixels P may be formed at the intersection of the plurality of data lines DL and the plurality of gate lines GL. Each of the plurality of pixels P may be connected to the data line and the gate line.

In the case where the image display device 100 is a liquid crystal display (LCD) device, the plurality of pixels may include a liquid crystal layer, and in the case where the image display device 100 is an organic light emitting diode (OLED) display device, the plurality of pixels may include an organic light emitting diode (OLED).

The display panel 210 may include a first substrate on which a driving element, such as a thin film transistor (TFT), and a pixel electrode connected thereto are formed, a second substrate on which a common electrode is formed, and a liquid crystal layer formed between the first substrate and the second substrate.

The panel driver 230 may drive the display panel 180 based on the control signal and the data signal transmitted from the controller 170. The panel driver 230 may include a timing controller 232, a gate driver 234 and/or a data driver 236.

The timing controller 232 may receive a control signal, an image signal, and the like from the controller 170. For example, the timing controller 232 may receive an RGB signal, a vertical synchronization signal Vsync, and the like from the controller 170. The timing controller 232 may control the gate driver 234 and/or the data driver 236 in response to the control signal. The timing controller 232 may rearrange the image signal according to specifications of the data driver 236 and transmit it to the data driver 236.

The gate driver 234 and the data driver 236 may supply a scan signal and an image signal to the display panel 210 through the gate lines GL and the data lines DL under the control of the timing controller 232.

Meanwhile, the data driver 236 may include a plurality of source driver integrated circuits (ICs) corresponding to the plurality of data lines DL.

The display 180 may further include a backlight unit 250 and/or a backlight dimming controller 260.

The backlight unit 250 supplies light to the display panel 210. To this end, the backlight unit 250 may include at least one light source 252 configured to output light, a scan driver 254 configured to control scan driving of the light source 252, and/or a light source driver 256 configured to turn on/off the light source 252.

The display 180 may display a predetermined image by using light output from the backlight unit 250 while light transmittance of the liquid crystal layer is adjusted by an electric field generated between the pixel electrode and the common electrode of the display panel 210.

The power supply unit 190 may supply a common electrode voltage Vcom to the display panel 210, and may supply a gamma voltage to the data driver 236. In addition, driving power for driving the light source 252 may be supplied to the backlight unit 250.

Meanwhile, the display 180 may be driven by local dimming. The backlight unit 250 may be divided into a plurality of blocks. The backlight unit 250 may be driven for each of the divided blocks. For example, in the case where the backlight unit 250 is driven by local dimming, the display panel 210 may have a plurality of divided areas corresponding to each of the blocks of the backlight unit 250. In this case, the brightness of light emitted from each of the blocks of the backlight unit 250 may be adjusted according to a luminance level, e.g., a peak value of a gray level or a color coordinate signal, of each of the divided areas of the display panel 210. That is, the image display device 100 may decrease the brightness of light emitted from a block corresponding to the dark part of the image and may increase the brightness of light emitted from a block corresponding to the bright part of the image, among the blocks of the backlight unit 250. In this manner, the contrast ratio and sharpness of the image output by the image display device 100 may be improved.

The image display device 100 may control the display 180 to perform local dimming by setting a dimming value for each of the blocks of the backlight unit 250. For example, the timing controller 232 may output an RGB signal to the backlight dimming controller 510. In this case, the backlight dimming controller 510 may calculate the dimming value of each of the blocks of the backlight unit 250, based on the RGB signal received from the timing controller 232.

The backlight dimming controller 510 may determine the luminance level for the entire area and/or a partial area of the image based on the RGB signal. For example, the backlight dimming controller 805 may determine an average luminance level (average picture level: APL) for each of the plurality of divided areas corresponding to each of the blocks of the backlight unit 550, an average luminance level for the entire area of image, and the like.

The backlight dimming controller 510 may calculate a dimming value of each of the blocks of the backlight unit 250 based on the luminance level of the entire area and/or partial area of the image. For example, the backlight dimming controller 510 may calculate a dimming value of each of the blocks of the backlight unit 250 based on the luminance level of each of the plurality of divided areas, the luminance level of a surrounding area, the luminance level of the entire area, and the like. In this case, the backlight dimming controller 510 may calculate the dimming value so that the brightness of light emitted from the block in the area with a low luminance level decreases, and the brightness of light emitted from the block in the area with a high luminance level increases, among the blocks of the backlight unit 250.

Meanwhile, the timing controller 232 and the backlight dimming controller 510 may be provided separately from each other or may be provided as one module. Alternatively, the timing controller 232 and the backlight dimming controller 510 may be included in the controller 170.

The backlight dimming controller 510 may output the calculated dimming value to the backlight unit 250. The backlight dimming controller 510 may output a signal including the calculated dimming value to the backlight unit 250. The backlight unit 250 may adjust the intensity of light emitted from the light source 252, based on the dimming value received from the backlight dimming controller 510.

Referring to FIG. 6, the backlight unit 250 according to an embodiment of the present disclosure may be implemented as a direct-type backlight unit.

The display panel 210 may be composed of a plurality of divided areas. FIG. 6 illustrates an example in which the display panel 210 is equally divided into 16 divided areas BL1 to BL16, but it is not limited thereto. Each of the plurality of divided areas BL1 to BL16 may include a plurality of pixels.

The backlight unit 250 may have a structure in which a plurality of optical sheets and a diffusion plate are stacked below the display panel 210, and a plurality of light sources are disposed below the diffusion plate.

The blocks B1 to B16 of the backlight unit 250 may respectively correspond to the divided areas BL1 to BL16 of the display panel 210. For example, a first block B1 of the backlight unit 250 may correspond to a first divided area BL1 of the display panel 210. In this case, the brightness of light incident on the first divided area BL1 of the display panel 210 may be adjusted by the light source 252 included in the first block B1 of the backlight unit 250 disposed at a position corresponding to the first divided area BL1 of the display panel 210.

The light source 252 provided in the blocks B1 to B16 of the backlight unit 250 may be implemented as point light sources such as a light emitting diode (LED).

The light source 252 may be turned on or off according to a driving signal received from the light source driver 256. The light source driver 256 may generate a driving signal based on the dimming value output from the backlight dimming controller 260. The driving signal may be a pulse width modulation (PWM) signal. For example, the brightness of light emitted from the light source 252 may be adjusted according to an amplitude of the driving signal received from the light source driver 256. For example, the time during which light is emitted from the light source 252 may be adjusted according to the pulse width of the driving signal received from the light source driver 256.

Referring to FIGS. 7 and 10, the backlight unit 250 may include a plurality of driving units 250*a* to 250*n*.

The plurality of driving units 250*a* to 250*n* may receive dimming values calculated for a plurality of blocks, a vertical synchronization signal Vsync corresponding to one frame, and the like from the backlight dimming controller 260. The plurality of driving units 250*a* to 250*n* may receive signals using Serial Peripheral Interface (SPI) communication.

The plurality of driving units 250*a* to 250*n* may receive dimming values calculated for a plurality of blocks, a vertical synchronization signal Vsync corresponding to one frame, and the like. The plurality of driving units 250*a* to 250*n* may receive signals using Serial Peripheral Interface (SPI) communication.

The plurality of driving units 250*a* to 250*n* may include light source drivers 256*a* to 256*n* and/or a plurality of light sources 252*a* to 252*n*.

Each of the light source drivers 256*a* to 256*n* may include at least one driver IC. Each of a plurality of driver ICs may output a driving signal for controlling the brightness of n blocks by using n channels. Each of the plurality of driver ICs may output a driving signal for adjusting the brightness of the light source 252, based on the dimming value calculated for the plurality of blocks. For example, in the case where each driver IC outputs a driving signal by using 16 channels, each driver IC may adjust the brightness of the light source 252 included in 16 blocks. In this case, in the case where a first light source driver 256*a* includes four driver ICs, the first light source driver 256*a* may adjust the brightness of the light sources 252 included in 4×16, i.e., 64 blocks, among the divided blocks of the backlight unit 250.

Each of the plurality of driving units 250*a* to 250*n* may include a substrate. For example, the substrate may be a printed circuit board (PCB). Components included in the plurality of driving units 250*a* to 250*n*, for example, driver ICs, may be respectively mounted on a plurality of substrates corresponding to the plurality of driving units 250*a* to 250*n*. Substrates corresponding to the plurality of driving units 250*a* to 250*n* may be disposed adjacent to each other in the order of the divided blocks of the backlight unit 250.

Meanwhile, the plurality of driving units 250*a* to 250*n* may further include a Digital Analog Converter (DAC). For example, in the case where a dimming value output from the backlight dimming controller 260 is a digital signal, the DAC may convert a digital dimming value into an analog value and output the analog value to the driver IC.

Referring to FIGS. 7 to 9, in a related art in which the local dimming method is used, each of the plurality of driving units 250*a* to 250*n* may receive a signal from the backlight dimming controller 260.

Referring to FIG. 7, each of the plurality of driving units 250*a* to 250*n* may be electrically connected to the backlight dimming controller 260 through cables 710 to 760 corresponding to the plurality of driving units 250*a* to 250*n*. For example, the cables 710 to 760 corresponding to the plurality of driving units 250*a* to 250*n* may be respectively connected to connectors mounted on substrates corresponding to the plurality of driving units 250*a* to 250*n*.

Referring to FIG. 8, a vertical synchronization signal Vsync corresponding to a frame output period and dimming values Data corresponding to the brightness of blocks when each frame is output may be input to each of the plurality of driving units 250*a* to 250*n* through the cables 710 to 760 corresponding to the plurality of driving units 250*a* to 250*n*.

Each of the plurality of driving units 250*a* to 250*n* may adjust the brightness of the light sources 252 included in the blocks constituting each of the plurality of driving units 250*a* to 250*n*, based on the vertical synchronization signal Vsync and the dimming values Data which are received through the cables 710 to 760.

Referring to FIG. 9, in the case where the backlight unit 250 includes 12 driving units, the backlight dimming controller 260 may be connected to each of the 12 driving units through cables 901 to 912. In this case, as a spacing distance from the backlight dimming controller 260 increases, the length of cables connected to the driving units may increase.

The length of the cables 901 to 912 may increase depending on the arrangement of other components included in the image display device 100. For example, in the case where a power supply component is disposed in a first region 910, second and fourth cables 902 and 904 may be disposed adjacent to a side portion of the image display device 100 along the edge of the first region 910. In addition, in the case where a communication module and the like are disposed in a second region 920, tenth and twelfth cables 910 and 912 connected to tenth and twelfth driving units may be disposed along the edge of the second region 920.

In this case, when the second and fourth cables 902 and 904 are disposed along the edge of the first region 910, the length thereof increases compared to the case where the cables are disposed across the first region 910. In addition, when the tenth and twelfth cables 910 and 912 are disposed along the edge of the second region 920, the length thereof increases compared to the case where the cables are disposed across the second region 920.

Meanwhile, referring to FIGS. 10 to 12, the backlight unit 250 of the image display device 100 according to an embodiment of the present disclosure may be composed of a plurality of groups 1001 to 1003 each including two or more of the plurality of driving units 250*a* to 250*n*. In the present disclosure, an example is illustrated in which two driving units are included in each of the plurality of groups 1001 to 1003, but the present disclosure is not limited thereto. For example, three or more driving units may be included in each of the plurality of groups 1001 to 1004.

The backlight dimming controller 260 may output signals corresponding to the plurality of groups 1001 to 1003. For example, in the case where the backlight unit 250 is composed of three groups, the backlight dimming controller 260 may output signals through cables 1010, 1030, and 1050 respectively corresponding to three groups that are electrically connected to the backlight dimming controller 260. Here, the cables 1010, 1030, and 1050 electrically connected to the backlight dimming controller 260 may be referred to as main cables.

The main cables 1010, 1030, and 1050 may be electrically connected to main driving units 250*a*, 250*c*, and 250*m*, respectively, among the plurality of driving units 250*a* to 250*n* included in the plurality of groups 1001 to 1003. For example, a first main cable 1010 may be connected to each of a connector, mounted on a substrate corresponding to the backlight dimming controller 260, and a connector mounted on a substrate corresponding to a first main driving unit 250*a* included in a first group 1001.

Meanwhile, among the driving units 250*a* to 250*n* included in each of the plurality of groups 1001 to 1003, remaining driving units 250*b*, 250*d*, and 250*n*, other than the main driving units 250*a*, 250*c*, and 250*m*, may be referred to as sub-driving units. The main driving units 250*a*, 250*c*, and 250*m* and the sub-driving units 250*b*, 250*d*, and 250*n*, which are included in each of the plurality of groups 1001 to 1003, may be electrically connected to each other. In this case, the cables 1020, 1040, and 1060 that electrically connect the driving units 250*a* to 250*n* included in each of the plurality of groups 1001 to 1003 may be referred to as sub-cables. For example, a first sub-cable 1020 may be connected to each of a connector mounted on a substrate corresponding to the first main driving unit 250*a* included in the first group 1001, and a connector mounted on a substrate corresponding to a second sub-driving unit 250*b*.

The main driving units 250*a*, 250*c*, and 250*m* and the sub-driving units 250*b*, 250*d*, and 250*n* may be disposed adjacent to each other. For example, a substrate corresponding to the first main driving unit 250*a* and a substrate corresponding to a first sub-driving unit 250*b* may be disposed adjacent to each other.

The signals output from the backlight dimming controller 260 may be output to the respective groups 1001 to 1003 through the main cables 1010, 1030, and 1050. In this case, the signals transmitted through the main cables 1010, 1030, and 1050 may be input to the main driving units 250*a*, 250*c*, and 250*m*.

The backlight dimming controller 260 may output signals H and L respectively corresponding to the main driving units 250*a*, 250*c*, and 250*m* and the sub-driving units 250*b*, 250*d*, and 250*n* which are included in the plurality of groups 1001 to 1003. Here, the signal H corresponding to the main driving units 250*a*, 250*c*, and 250*n* may be referred to as a main signal, and the signal L corresponding to the sub-driving units 250*b*, 250*d*, and 250*n* may be referred to as a sub-signal. For example, a signal that is output by the backlight dimming controller 260 for the first group 1001 may include the main signal H corresponding to the first main driving unit 250*a* and the sub-signal L corresponding to the first sub-driving unit 250*b*.

Meanwhile, the signals transmitted through the main cables 1010, 1030, and 1050 may be transmitted as they are through the sub-cables 1020, 1040, and 1060. For example, the vertical synchronization signal Vsync, the dimming values Data, the main signal H, and the sub-signal L may be transmitted as they are to the first sub-driving unit 250*b* through the first sub-cable 1020.

The main cables 1010, 1030, and 1050 and/or the sub-cables 1020, 1040, and 1060 may be flat flexible cables (FFCs).

Referring to FIG. 11, the vertical synchronization signal Vsync corresponding to a frame output period, the dimming values Data corresponding to the brightness of blocks when each frame is output, and the main signal H, and the sub-signal L may be input through the main cables 1010, 1030, and 1050 to each of the main driving units 250*a*, 250*c*, and 250*m* among the plurality of driving units 250*a* to 250*n*.

The main driving units 250*a*, 250*c*, and 250*m* may determine, based on the main signal H, dimming values of blocks corresponding to the main driving units 250*a*, 250*c*, and 250*m*, among dimming values Data transmitted through the main cables 1010, 1030, and 1050. For example, the main driving units 250*a*, 250*c*, and 250*m* may determine dimming values, transmitted in a period in which the main signal H is high, to be dimming values of the blocks corresponding to the main driving units 250*a*, 250*c*, and 250*m*, among the dimming values Data transmitted through the main cables 1010, 1030, and 1050.

The main driving units 250*a*, 250*c*, and 250*m* may adjust brightness of the light sources 252 included in the blocks constituting the main driving units 250*a*, 250*c*, and 250*m*, based on the vertical synchronization signal Vsync received through the main cables 1010, 1030, and 1050 and the dimming values of the blocks corresponding to the main driving units 250*a*, 250*c*, and 250*m*.

Meanwhile, the vertical synchronization signal Vsync, the dimming values Data, the main signal H, and the sub-signal L, which are transmitted through the main cables 1010, 1030, and 1050 may be input through the sub-cables 1020, 1040, and 1060 to each of the sub-driving units 250*b*, 250*d*, and 250*n* among the plurality of driving units 250*a* to 250*n*.

The sub-driving units 250*b*, 250*d*, and 250*n* may determine, based on the sub-signal L, dimming values of the blocks corresponding to the sub-driving units 250*b*, 250*d*, and 250*n* among the dimming values Data transmitted through the sub-cables 1020, 1040, and 1060. For example, the sub-driving units 250*b*, 250*d*, and 250*n* may determine dimming values, transmitted in a period in which the sub-signal L is high, to be dimming values of the blocks corresponding to the sub-driving units 250*b*, 250*d*, and 250*n*, among the dimming values Data transmitted through the sub-cables 1020, 1040, and 1060.

The sub-driving units 250*b*, 250*d*, and 250*n* may adjust brightness of the light sources 252 included in the blocks constituting the sub-driving units 250*b*, 250*d*, and 250*n*, based on the vertical synchronization signal Vsync received through the sub-cables 1020, 1040, and 1060 and dimming values of the blocks corresponding to the sub-driving units 250*b*, 250*d*, and 250*n*.

Meanwhile, the period in which the main signal H is high and the period in which the sub-signal L is high may not overlap each other. That is, in response to an end of the period in which either one of the main signal H and the sub-signal L is high, the period in which a remaining one of the main signal H and the sub-signal L is high may be initiated.

In the present disclosure, an example is illustrated in which dimming values transmitted in the period in which the main signal H is high are determined to be dimming values of the blocks corresponding to the main driving units 250*a*, 250*c*, and 250*m*, and dimming values transmitted in the period in which the sub-signal L is high are determined to be dimming values of the blocks corresponding to the sub-driving units 250*b*, 250*d*, and 250*n*, but the present disclosure is not limited thereto. For example, dimming values transmitted in a period in which the main signal H is low may be determined to be dimming values of the blocks corresponding to the main driving units 250*a*, 250*c*, and 250*m*, and dimming values transmitted in a period in which the sub-signal L is low may be determined to be dimming values of the blocks corresponding to the sub-driving units 250*b*, 250*d*, and 250*n*.

Referring to FIG. 12, in the case where the backlight unit 250 includes 12 driving units, the backlight unit 250 may be composed of six groups each including two driving units. In this case, each of the six groups may include one main driving unit and one sub-driving unit.

The backlight dimming controller 260 may be connected to each of six main cables 1201, 1203, 1205, 1207, 1209, and 1211. The six main cables 1201, 1203, 1205, 1207, 1209, and 1211 may be connected to six main driving units, respectively. For example, the six main cables 1201, 1203, 1205, 1207, 1209, and 1211 may be connected to a first connector mounted on each of six substrates corresponding to the main driving units.

Meanwhile, the six main driving units may be connected to six sub-cables 1202, 1204, 1206, 1208, 1210, and 1212, respectively. For example, the six sub-cables 1202, 1204, 1206, 1208, 1210, and 1212 may connect a second connector mounted on each of the six substrates corresponding to the main driving units, and a third connector mounted on each of the six substrates corresponding to the sub-driving units.

In this case, the first connector, to which the main cables 1201, 1203, 1205, 1207, 1209, and 1211 are connected, may be positioned on a substrate adjacent to the backlight dimming controller 260. For example, in the case in which the backlight dimming controller 260 is disposed adjacent to an upper side of the image display device 100, the first connector may be mounted adjacent to an upper side of a substrate corresponding to the main driving unit.

Meanwhile, the second connector and the third connector, to which the sub-cables 1202, 1204, 1206, 1208, 1210, and 1212 are connected, may be disposed adjacent to each other. For example, the second connector may be disposed adjacent to a lower side of a substrate corresponding to the main driving unit, and the third connector may be disposed adjacent to an upper side of a substrate corresponding to a sub-driving unit.

As described above, in the case where the main cables 1201, 1203, 1205, 1207, 1209, and 1211 connect the backlight dimming controller 260 and the main driving units, and the sub-cables 1202, 1204, 1206, 1208, 1210, and 1212 connect the main driving units and the sub-driving units, the lengths of the cables may be relatively reduced compared to the case where the backlight dimming controller 260 is connected to each of the plurality of driving units. In this manner, it is possible to minimize noise components included in signals transmitted to the plurality of driving units. Further, it is possible to reduce impedance of the cables for transmitting signals to the plurality of driving units, thereby improving performance related to power consumption of the image display device 100 and the like.

As described above, according to various embodiments of the present disclosure, the connection structure between components provided for adjusting the intensity of light emitted by the light source 252 may be simplified.

In addition, according to various embodiments of the present disclosure, the length of a signal line configured to transmit signals to the backlight unit 250 may be minimized.

The accompanying drawings are merely used to help easily understand embodiments of the present disclosure, and it should be understood that the technical features presented herein are not limited by the accompanying drawings. As such, the present disclosure should be construed to extend to any alterations, equivalents and substitutes in addition to those which are particularly set out in the accompanying drawings.

The method of operating the image display device of the present disclosure may be implemented as code that can be written to a processor-readable recording medium and can thus be read by a processor included in the image display device. The processor-readable recording medium may be any type of recording device in which data can be stored in a processor-readable manner. Examples of the processor-readable recording medium include a ROM, a RAM, a CD-ROM, a magnetic tape, a floppy disk, an optical data storage, and a carrier wave, e.g., data transmission over the Internet. Furthermore, the processor-readable recording medium can be distributed over a plurality of computer systems connected to a network so that processor-readable code is written thereto and executed therefrom in a decentralized manner.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. An image display device comprising:

a display panel;

a backlight unit including a plurality of blocks composed of light sources; and a controller, wherein the backlight unit comprises a plurality of driving units each including a driver integrated circuit (IC) configured to adjust an intensity of light emitted from the respective blocks, wherein the plurality of driving units comprise main driving units electrically connected to the controller through main cables, and sub-driving units electrically connected to the main driving units through sub-cables, wherein signals transmitted to the main driving units through the main cables are transmitted to the sub-driving units through the sub-cables, wherein the controller is configured to output, through the main cables, a first signal including a dimming value of each block that corresponds to the intensity of light emitted from each of the plurality of blocks, a second signal corresponding to the main driving unit, and a third signal corresponding to the sub-driving unit, wherein the main driving unit is configured to determine a first dimming value corresponding to the main driving unit from a first portion of the first signal corresponding to the second signal, and the sub-driving unit is configured to determine a second dimming value corresponding to the sub-driving unit from a second portion of the first signal corresponding to the third signal, wherein in response to an end of a period in which either one of the second signal and the third signal is high, a period in which a remaining one of the second signal and the third signal is high is initiated.

2. The image display device of claim 1, wherein:

the main driving unit is configured to determine a dimming value, corresponding to a period in which the second signal is high, to be the first dimming value among the dimming values for the respective blocks included in the first signal; and the sub-driving unit is configured to determine a dimming value, corresponding to a period in which the third signal is high, to be the second dimming value among the dimming values for the respective blocks included in the first signal.

3. The image display device of claim 1, wherein:

a first driver IC included in the main driving unit is configured to output, based on the first dimming value, a first driving signal for adjusting an intensity of light emitted from a first block corresponding to the main driving unit; and a first driver IC included in the sub-driving unit is configured to output, based on the second dimming value, a second driving signal for adjusting an intensity of light emitted from a second block corresponding to the sub-driving unit.

4. The image display device of claim 1, wherein the controller is configured to output the first signal to the third signal using Serial Peripheral Interface (SPI) communication.

5. The image display device of claim 1, wherein the driver IC is configured to output a driving signal which is a Pulse Width Modulation (PWM) signal, wherein the intensity of light emitted from the block corresponds to an amplitude of the driving signal, and a time during which the light is emitted from the block corresponds to a pulse width of the driving signal.

6. The image display device of claim 1, wherein the display panel comprises a plurality of divided areas respectively corresponding to the plurality of blocks, wherein the controller is configured to determine luminance, corresponding to each of the plurality of divided areas, based on an image signal and to calculate the diming values for the respective blocks based on the luminance corresponding to each of the divided areas.

7. The image display device of claim 1, wherein the main cables and the sub-cables are Flat Flexible Cables (FFCs).

8. An image display device comprising:

a display panel;

a backlight unit including a plurality of blocks composed of light sources; and a controller, wherein the backlight unit comprises a plurality of driving units each including a driver integrated circuit (IC) configured to adjust an intensity of light emitted from the respective blocks, wherein the plurality of driving units comprise main driving units electrically connected to the controller through main cables, and sub-driving units electrically connected to the main driving units through sub-cables, wherein signals transmitted to the main driving units through the main cables are transmitted to the sub-driving units through the sub-cables, wherein the controller is configured to output, through the main cables, a first signal including a dimming value of each block that corresponds to the intensity of light emitted from each of the plurality of blocks, a second signal corresponding to the main driving unit, and a third signal corresponding to the sub-driving unit, wherein the main driving unit is configured to determine a first dimming value corresponding to the main driving unit from a first portion of the first signal corresponding to the second signal, and the sub-driving unit is configured to determine a second dimming value corresponding to the sub-driving unit from a second portion of the first signal corresponding to the third signal, wherein the main driving unit comprises a first substate on which a first connector connected to the main cable and a second connector connected to the sub-cable are mounted, and the sub-driving unit comprises a second substrate on which a third connector connected to the sub-cable is mounted, wherein the first substrate and the second substrate are disposed adjacent to each other.

9. The image display device of claim 8, wherein the first connector is disposed adjacent to the controller, and the second connector and the third connector are disposed adjacent to each other.

* * * * *